Figure 1:
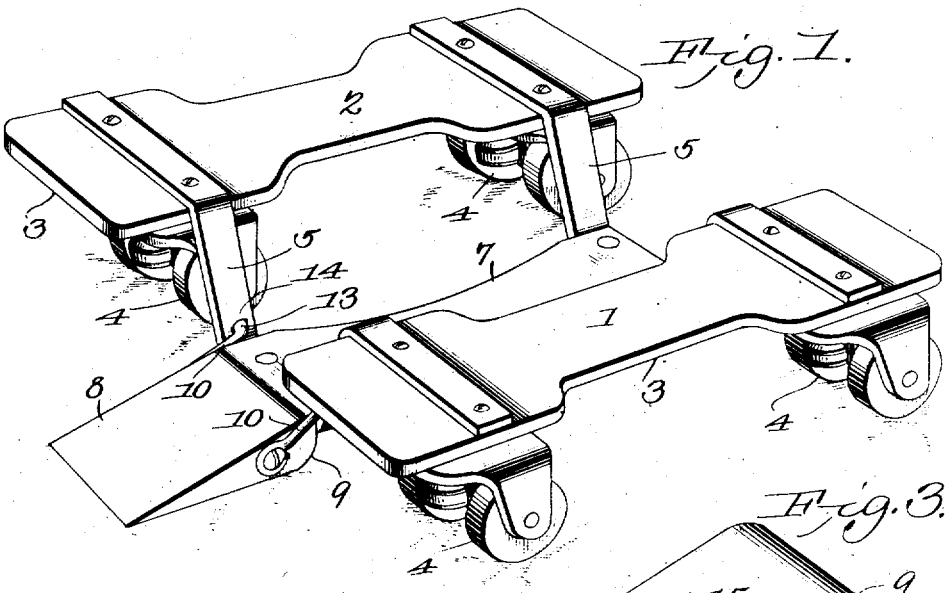

No. 12,430. REISSUED JAN. 2, 1906.

H. WEBER.

TRUCK

APPLICATION FILED MAY 26, 1905.

Witnesses

E. F. Stewart

Jno. E. Parker

Herman Weber,

Inventor, by C. A. Snow & Co.

Attorneys

UNITED STATES PATENT OFFICE.

HERMAN WEBER, OF COLORADO SPRINGS, COLORADO.

TRUCK.

No. 12,430. Specification of Reissued Letters Patent. Reissued Jan. 2, 1906.

Original No. 772,014, dated October 11, 1904. Application for reissue filed May 26, 1905. Serial No. 262,508.

*To all whom it may concern:*

Be it known that I, HERMAN WEBER, a citizen of the United States, residing at Colorado Springs, in the county of El Paso and State of Colorado, have invented a new and useful Truck, of which the following is a specification.

This invention relates to trucks.

The object of the invention is to provide a truck adapted more particularly for use in moving automobiles and other wheeled vehicles in which such vehicles may be readily turned or moved in any direction, either backward, forward, or sidewise, and in which the employment of jacks or other lifting mechanism to position the vehicle upon the truck is obviated.

With the above and other objects in view, as will appear as the nature of the invention is better understood, the same consists, generally stated, in a truck comprising wheeled bolsters, drop frame-bars connecting the bolsters, and a load-supporting platform carried by the bars between the bolsters.

The invention consists, further, in a truck including casters, a load-supporting platform between them, and a drop-frame including the casters and serving as a support for such platform.

The invention consists, further, in a truck comprising casters and a load-receiving platform arranged between and supported by the casters, the load-receiving platform being disposed approximately in the horizontal plane of the revoluble elements of the casters.

The invention consists, further, in a truck comprising a pair of wheeled bolsters, drop frame-bars connecting the bolsters, a load-supporting platform carried by the bars, and a skid coacting with the platform.

The invention consists, further, in a truck comprising a pair of wheeled bolsters, drop frame-bars connecting the bolsters, a dished load-supporting platform carried by the frame-bars, and a skid pivotally connected with one of the frame-bars.

The invention consists, further, in a truck comprising a pair of wheeled bolsters, drop frame-bars connecting the bolsters, a dished load-supporting platform carried by the frame-bars, and a wedge-shaped skid pivotally connected with one of the frame-bars.

The invention consists, further, in a truck comprising a pair of bolsters, caster-wheels combined therewith, drop frame-bars connecting the bolsters, a dished load-supporting platform carried by the frame-bars, and a wedge-shaped skid connected with one of the frame-bars and provided on its under side with spurs.

The invention consists, further, in the novel construction and combination of parts of a truck, as will be hereinafter fully described and claimed.

In the accompanying drawings, forming a part of this specification, and in which like characters of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof.

Figure 3:
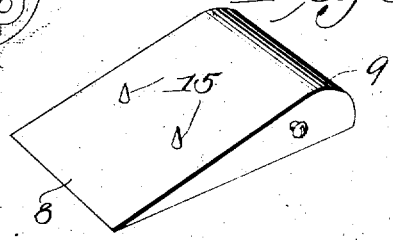
Figure 2:
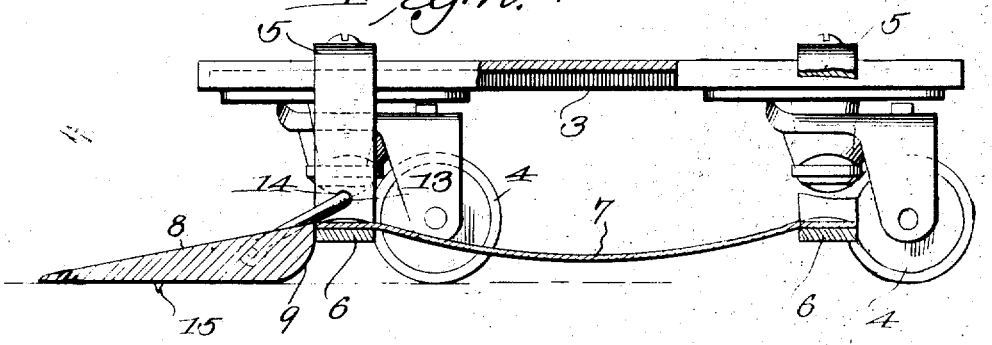

In the drawings, Figure 1 is a view in perspective of a truck constructed in accordance with the present invention. Fig. 2 is a view in vertical longitudinal section. Fig. 3 is a detached detail view of the skid viewed from its under side.

Referring to the drawings, 1 and 2 designate a pair of bolsters, which may be made of any suitable material, preferably of metal, the edges of each of which are reinforced by a downward-extending flange 3. Each of these bolsters carries at each end a two-wheeled caster 4, which will be of the character usually employed on heavy furniture to facilitate its turning or moving.

The bolsters are connected and braced by a pair of drop frame-bars 5, which may be secured to the bolsters in any preferred manner and be constructed of flat metal bars or the like, the bases 6 of the bends being disposed adjacent to the floor or the ground in order to facilitate the positioning of the vehicle upon the structure. Secured to the bases of the frame-bars is a load-supporting platform 7, preferably of a sheet of metal dished longitudinally in order to assist in holding the vehicle in position thereon.

By arranging the bases 6 of the bends adjacent to the floor or ground and placing the load-supporting platform directly thereon the platform is disposed approximately in or below the horizontal plane of the revoluble elements of the bolsters, so that by lowering the center of gravity there will be less likelihood of tilting of the truck when moving a heavy load.

To obviate the employment of jacks or other lifting mechanisms in positioning the vehicle upon the load-supporting platform, a skid 8 is employed, the same being wedge-shaped and having its rear end rounded at 9 to prevent interference with the base of the frame-bar to which it is connected, the connection between the skid and the frame-bar being effected through the medium of a pair of arms 10, secured on the opposite sides of the skid and having extensions 13, which extend through openings 14 in the side members of one of the frame-bars.

To hold the structure against moving when a vehicle is being positioned thereon, the under side of the skid is provided with a plurality of prongs or spurs 15, which will sink into the floor or ground, and thus hold the structure from movement until the vehicle is properly positioned thereon.

In use one of these trucks may be placed under each wheel of the vehicle, and when this number is employed the heaviest automobile may be readily turned or moved backward, forward, or laterally by a single attendant. Instead of using four of the trucks, but two may be used, and these may be placed under the front or back wheels of the vehicle, as preferred, and when thus positioned the vehicle may be readily turned, but not moved laterally.

By the employment of the casters the truck may be moved in a circle, so that where the space is limited its use will be found of the highest advantage.

While the arrangement of the truck herein shown has been found thoroughly effective in use, it is to be understood that the invention is not to be limited to the exact arrangement of the parts, as these may be varied or wholly changed without departing from the spirit of the invention.

Having thus described the invention, what is claimed is—

1. A truck comprising casters, a drop-frame extending transversely of the truck and connecting the casters, said frame being permanently secured to and serving to maintain the casters in fixed relative positions, and a fixed load-receiving platform supported by said drop-frame.

2. A truck comprising casters, a load-receiving platform between them, a loading member extending from one end of the platform proper to a point beyond the casters, and a drop-frame connecting the casters and serving as a support for such platform.

3. A truck comprising casters, and a load-receiving platform arranged between and supported by the casters, there being a loading member extending from the receiving end of the platform to a point beyond the line of the casters, the platform having a dished load-receiving surface disposed approximately in the horizontal plane of the revoluble elements of the casters.

4. A truck comprising wheeled bolsters, drop frame-bars connecting the bolsters, and a load-supporting platform carried by the bars between the bolsters.

5. A truck comprising a pair of wheeled bolsters, drop frame-bars connecting the bolsters, a load-supporting platform carried by the bars, and a skid coacting with the platform.

6. A truck comprising a pair of wheeled bolsters, drop frame-bars connecting the bolsters, a dished load-supporting platform carried by the frame-bars, and a skid pivotally connected with one of the frame-bars.

7. A truck comprising a pair of wheeled bolsters, drop frame-bars connecting the bolsters, a dished load-supporting platform carried by the frame-bars, and a wedge-shaped skid pivotally connected with one of the frame-bars.

8. A truck comprising a pair of bolsters, caster-wheels combined therewith, drop frame-bars connecting the bolsters, a dished load-supporting platform carried by the frame-bars, and a wedge-shaped skid connected with one of the frame-bars and provided on its under side with spurs.

In testimony that I claim the foregoing as my own I have hereto affixed my signature in the presence of two witnesses.

HERMAN WEBER.

Witnesses:
E. F. Smith,
James P. Davis.